United States Patent [19]
Rustad

[11] 3,718,619
[45] Feb. 27, 1973

[54] CURING POLYURETHANE PREPOLYMERS WITH LIQUID EXTENDER COMPRISING 4,4'-METHYLENEBIS(2-CHLOROANILINE) AND ETHYLENE OXIDE CAPPED BISPHENOL A

[75] Inventor: Norman E. Rustad, Barrington, Ill.

[73] Assignee: The Quaker Oats Company, Chicago, Ill.

[22] Filed: Aug. 27, 1971

[21] Appl. No.: 175,699

[52] U.S. Cl.................. 260/47 CB, 260/77.5 AM, 260/775 AA
[51] Int. Cl. ..............................................C08g 22/14
[58] Field of Search...260/77.5 AM, 77.5 AA, 47 CB

[56]  References Cited

UNITED STATES PATENTS 3,583,926  6/1971  Zwolinski et al.............260/77.5 AM
3,316,220  4/1967  Ramos.........................260/77.5 AM Primary Examiner—Donald E. Czaja
Assistant Examiner—M. J. Welsh
Attorney—Grace J. Fishel et al.

[57]  ABSTRACT

This invention relates to the curing of isocyanate terminated polyurethane prepolymers with a liquid extended consisting of 4,4'-methylenebis(2-chloroaniline) and ethylene oxide capped bisphenol A.

5 Claims, No Drawings

CURING POLYURETHANE PREPOLYMERS WITH LIQUID EXTENDER COMPRISING 4,4'-METHYLENEBIS(2-CHLOROANILINE) AND ETHYLENE OXIDE CAPPED BISPHENOL

BACKGROUND OF THE INVENTION

1. FIELD OF THE INVENTION

This invention concerns a novel process for the preparation of certain polyurethanes.

2. DESCRIPTION OF THE PRIOR ART 4,4'-Methylenebis(2-chloro-aniline) is desirable as an extender for polyurethane prepolymers because of the properties it imparts to the polyurethane product. In commercial practice 4,4'-methylenebis-(2-chloroaniline) is usually mixed as a molten fluid into a heated polyurethane prepolymer. Melting the solid diamine is inconvenient and hazardous since 4,4'-methylenebis(2-chloro-aniline) gives off potentially carcinogenic vapors at its melting point. Furthermore, the addition of molten 4,4'-methylenebis(2-chloroaniline) to the preheated polyurethane prepolymer results in a polyurethane which has a short pot life. That is, there is insufficient time in most cases for mixing the molten diamine with the prepolymer and pouring of the mixture into molds before the mixture becomes unpourable.

To overcome some of the difficulties associated with the incorporating solid, 4,4'-methylenebis(2-chloroaniline) into a polyurethane prepolymer, many searchers have looked for a process of extending polyurethane prepolymers with an extender containing the above diamine, which extender is a liquid at room temperature and provides polyurethanes having a longer pot life.

Processes based on the use of extender systems containing 4,4'-methylenebis(2-chloroaniline) dissolved in certain solvents have been proposed and enjoy limited success. 4,4'-Methylenebis(2-chloroaniline) has been dissolved in volatile solvents such as ketones, e.g., acetone or methyl-ethylketone; chlorinated hydrocarbons, e.g., methylene chloride or dichloroethane; esters, e.g., methyl, ethyl, methyl glycol or ethylglycolacetates; and alcohols, e.g. methyl glycol. Other volatile solvents tried include dimethylsulfoxide, dimethylformamide, dimethylacetamide, propylene carbonate, tetrahydrofuran and the like. The principal difficulty arising from the use of these extender systems is that the escaping volatile solvent adversely affects the physical properties of the cured polyurethane elastomer.

4,4'Methylenebis(2-chloroaniline) has also been dissolved in non-volatile solvents such as 1,4-butanediol diglycidyl ether. The major difficulty in the use of this extender system is that the 1,4-butanediol diglycidyl ether is mixed into the cured polyurethane product and alters the physical properties thereof.

In view of the above, there is still a need for a process for curing polyurethane prepolymers with a liquid extender containing 4,4'-methylenebis(2-chloroaniline) which provides polyurethanes with satisfactory pot lives and good physical properties.

SUMMARY OF THE INVENTION

It is an object of this invention to provide an improved and simple method of curing polyurethane prepolymers wherein the extender is a liquid at room temperature.

Another object of this invention is to provide a process for curing a polyurethane prepolymer wherein the pot life of the polyurethane is satisfactory.

Still another object of this invention is to provide a new process for preparing certain polyurethanes with good physical properties.

The objects of this invention are accomplished by a method for producing polyurethanes which comprises mixing a polyurethane prepolymer having NCO termination with a liquid extender, said polyurethane prepolymer being heated to a temperature between about 70°C. and about 100°C., and said extender prepared by the steps:

a. admixing 0.1 to 4 equivalents of 4,4'-methylenebis(2-chloroaniline) to 1 equivalent of ethylene oxide capped 4,4'-isopropylidenediphenol; and b. heating the admixture to solubilize the 4,4'-methylenebis(2-chloroaniline) in the ethylene oxide capped 4,4'-isopropylidenediphenol.

The term ethylene oxide capped 4,4'-isopropylidenediphenol is to be understood to mean that ethylene oxide has been permitted to react with 4,4'-isopropylidenediphenol in a molar ratio greater than 2 to 1 and preferably has an average molecular weight about 500.

The term polyurethane prepolymer in this application is used in the same manner as in the prior art. Such polyurethane prepolymers are usually prepared by reacting an excess of an organic diisocyanate with a long-chain glycol so that the prepolymer is NCO terminated. Generally the glycols used are polyether glycols or polyester glycols. The equivalent ratio of diisocyanate to glycol should be greater than one and is preferably large enough so that the polyurethane prepolymer is liquid. The equivalent ratio of diisocyanate to glycol may be between 1.5 and 2.5. I prefer to use an equivalent ratio of NCO/OH of about 2/1.

Typical polyether glycols useful in the preparation of polyurethane prepolymers may be represented by the formula $HO(RO)_nH$ where R is an alkylene radical containing up to 10 carbon atoms and which may be straight or branched chain. N is an integer sufficiently large that the average molecular weight of the polyether glycol is about 500 to 4000. Representative examples of suitable polyether glycols are poly-1,2-propyleneether glycol, ethylene oxide - a modified polypropyleneether glycol, polytetramethyleneether glycol, and polypentamethyleneether glycol.

Typical polyester glycols should contain a plurality of hydroxyl groups, have an acid number less than 2, and have an average molecular weight between about 500 and 4000. Suitable polyester glycols are made by the polymerization of cyclic lactones such as ε-caprolactone or by the condensation polymerization of a dicarboxylic acid and a molar excess of an organic diol. Optionally, a small amount of a triol (e.g. trimethylolpropane) may be included to provide cross-linking. Representative examples of useful diols are ethylene glycol, 1,2-propyleneglycol, 1,3-propanediol, 1,2-butyleneglycol, 1,4-butanediol, diethyleneglycol, triethyleneglycol, and 1,2-alkylene oxide - modified glycols. Other useful triols include for example, glycerol, trimethylolethane, and 1,2-alkylene oxide - modified glycerol. Representative examples of useful dicarboxylic acids are oxalic acid, malonic acid, succinic acid, glutaric acid, adipic acid, pimelic acid, suberic acid, azelaic acid, sebacic acid, fumaric acid, maleic acid, and phthalic acid. Anhydrides of dicarboxylic acids may be employed in the place of the acids; succinic anhydride and phthalic anhydride are representative examples.

A wide variety of aliphatic and aromatic polyisocyanates may be used to form the polyurethane prepolymers useful in this invention. The polyisocyanates should contain greater than 1.5 isocyanate groups per molecule. Representative aliphatic polyisocyanates include 1,4-tetramethylene diisocyanate, 1,6-hexamethylene diisocyanate, 2,2,4-trimethyl-1,6-hexamethylene diisocyanate, m- and p- xylylene diisocyanate, $\alpha,\alpha,\alpha,\alpha$-tetramethyl-p-xylylene diisocyanate, 3-isocyanato-methyl-3,5,5-trimethylcyclohexylisocyanate, 4-methyl-1,3-cyclo-hexylene diisocyanate, 2-methyl-1,3-cyclohexylene diisocyanate, and 4,4'-methylenebis(cyclohexylisocyanate).

Examples of suitable aromatic polyisocyanates are tolylene diisocyanate, diphenyl methane diisocyanate, diphenyl diisocyanate, triphenyl diisocyanate, chlorophenyl-2,3-diisocyanate, p-phenylene diisocyanate, 3,3'-dimethyl-4,4'-biphenylene diisocyanate, 3,3'-dimethoxy-4,4'-biphenyl-methane-4,4'-diisocyanate, and naphthalene diisocyanate.

Polyisocyanates having an isocyanate functionality greater than 2 are useful in the preparation of polyurethane prepolymers but are likely to form a cured polyurethane which are not elastomeric. Suitable higher polyisocyanates for example include:

2,4-bis(4-isocyanatocyclohexyl-methyl)cyclohexylisocyanate polymethylene polyphenylisocyanate, 1,2,4-benzene triisocyanate, and triphenylmethane triisocyanate.

In carrying out the process of my invention, the 4,4'-methylenebis(2-chloroaniline) is first solubilized in the ethylene oxide capped 4,4'-isopropylidenediphenol. Optionally, small amounts of tri-alcohols may be substituted for part of the ethylene oxide capped 4,4'-isopropylidenediphenol. Less than 50 percent based on the total number of equivalents of ethylene oxide capped 4,4'-isopropylidenediphenol and tri-alcohol in the extender should be tri-alcohol. As is well known in the art, the presence of small amounts of tri-alcohols such as glycerol, triethanolamine, trimethylolethane, and trimethylolpropane for example provide cross-linking which improves, for example, solvent resistance.

The solid organic diamine is added to the ethylene oxide capped 4,4'-isopropylidenediphenol and heated for a sufficient time and at an effective temperature to cause the 4,4'-methylenebis(2-chloroaniline) to dissolve. While the solid organic diamine may be dissolved in the diol at room temperature, I prefer to heat the mixture to between 70°C. and 90°C. with agitation. I do not find it advantageous to heat the mixture to temperatures much above 100°C. since 4,4'-methylenebis(2-chloroaniline) forms substantial amounts of carcinogenic vapors at those temperatures. After the solid organic diamine is dissolved, the mixture is cooled to room temperature. While as much as four equivalents of 4,4'-methylene-bis(2-chloroaniline) may be dissolved in one equivalent of the ethylene oxide capped 4,4'-isopropylidenediphenol to give room temperature stable solutions, the stability of the solution decreases as the amount of diamine increases. For example, a solution containing 1 equivalent of 4,4'-methylene-bis(2-chloroaniline) in 1 equivalent of ethylene oxide capped 4,4'-isopropylidenediphenol was stable for an indefinite time, a solution containing 1.5 equivalents of 4,4'-methylenebis(2-chloroaniline) in 1 equivalent of ethylene oxide capped 4,4'-isopropylidenediphenol was stable for 7 weeks, a solution containing two equivalents of 4,4'-methylenebis(2-chloroaniline) in one equivalent of ethylene oxide capped 4,4'-isopropylidene-diphenol was stable for 1 week, and 4 equivalents of 4,4'-methylene- bis(2-chloroaniline) in 1 equivalent of ethylene oxide capped 4,4'-isopropylidenediphenol was stable for a day or less at room temperature. A solution containing as much as four equivalents of 4,4'-methylenebis(2-chloroaniline) can be used in may process but must be made immediately before use or stored at temperatures above room temperature.

The polyurethane prepolymer and the liquid extender comprising 4,4'-methylenebis(2-chloroaniline) in ethylene oxide capped 4,4'-isopropylidenediphenol are admixed together. While the number of equivalents of liquid extender compared to the number of equivalents of polyurethane prepolymer is not narrowly critical, they should be substantially equal. By substantially equal, I mean that the equivalent ratio of liquid extender to polyurethane prepolymer may be between about 0.8 to 1 and 1.1 to 1.

The mixing of the polyurethane prepolymer and the liquid extender is most advantageously carried out by adding the liquid extender at room temperature to the polyurethane prepolymer, which is preheated to a temperature between about 70°C. and 100°C. If the temperature of the polyurethane prepolymer is at the lower end of the above range, the pot life of the polyurethane will be longer than if it is at the upper end of the range. Throughout the range however, the pot life of the polyurethane prepared by my process will be longer than that prepared with molten 4,4'-methylenebis(2-chloro-aniline) by the conventional prior art process. While the extender used in my process may be preheated, it serves no useful purpose and eliminates some of the advantages of my process.

Because of the reactivity of the liquid extender and the polyurethane prepolymer in my process, cure takes place without the aid of catalysts. If very fast cure is desired, the polyurethane product may be heated, for example, in an oven at a temperature up to about 250°F. or 300°F. until full cure is attained. Inasmuch as the time required for full cure is generally inversely related to the temperature of cure and dependent on other factors such as the particular prepolymer used, the degree of cure desired, the size of the article, the character of the heating device, etc., it is to be understood that curing conditions are not critical but simply follow conventional practice. As is known in the art, the physical properties of the cured polyurethanes may in some instances be optimized by heat aging the cured polyurethane at temperatures between about 25°C. and 130°C. for periods of time ranging from hours to several days.

The polyurethane resins prepared by my process may be cast into films, coated onto surfaces, or used for any other standard polyurethane application.

DESCRIPTION OF THE PREFERRED EMBODIMENTS

The following examples are shown for the purpose of illustrating and demonstrating the invention. It will be apparent to those skilled in the art that various changes and modifications may be made therein without departing from the spirit and scope of the invention as it is more precisely defined in subjoined claims.

Throughout this application, it is to be understood that room temperature means about 25°–27°C. All parts or percentages are by weight unless otherwise indicated. The tests and instrumentation used throughout the examples are listed below:

| Property | Test | Instrument |
| --- | --- | --- |
| Tensile strength | ASTM D–412 (Die C) | Instron |
| Elongation | ASTM D–412 (Die C) | Instron |
| 100% Modulus | ASTM D–412 (Die C) | Instron |
| 300% Modulus | ASTM D–412 (Die C) | Instron |
| Tear Strength | | |
| Die C | ASTM D–624 | Instron |
| Split | ASTM D–470 | Instron |
| Abrasion resistance | Wt. loss [g.] less 1000 Revolutions of Wheel H-18 with 1000 g. Weight | Tabor |
| Resiliency | | Bashore |
| Compression Set | ASTM D–395 | |
| $T_f$ | ASTM D–1043 | Clash and Berg |
| Hardness | | |
| Shore A | | Durometer |
| Shore D | | Durometer |

EXAMPLE 1

Polyurethane Prepolymer 1 of Table I were prepared by the following procedure: 1 equivalent of a polytetramethylene ether glycol having an average molecular weight of 1000 was stripped of moisture for 1 hour at 100°C. under a reduced pressure of 2mm. of Hg and then cooled to room temperature. Two equivalents of 2,4-toluene diisocyanate was added to the cooled polyol and the temperature then brought to 80°C. controlling the exotherm which took place.

The composition of the extender used to cure Polyurethane Prepolymer 1 is given in Table I. The 4,4'-methylene-bis(2-chloroaniline) was in each solubilized in the ethylene oxide capped 4,4'-isopropylidenediphenol by heating the mixture to 90°C. with agitation and under a reduced pressure of 5mm. of Hg. The resulting solution was then cooled to room temperature.

To prepare the polyurethane 1.0 equivalent of the polyurethane prepolymer described above was blended with 0.95 equivalent of the extender described in Table I. The polyurethane has a satisfactory pot life and was poured into molds which had been heated to 100°C. When the polyurethane had rubberized; the molds were closed, clamped, and placed in a 100°C. oven for 1 hour. After 1 hour the polyurethane product was demolded and post cured for 16 hours at 100°C. and then for 5 days at room temperature. The properties of the elastometer prepared in this example is given in Table I.

EXAMPLE 2

Polyurethane Prepolymers 2 of Table I was prepared by the procedure of Example 1.

To the polyurethane prepolymer was added 0.95 equivalent of 4,4'-methylenebis(2-chloroaniline) which had been liquified at 120°C. The fluid resin was poured into molds, cured, and post cured in exactly the same manner as described in Example 1. The polyurethane elastomer had a short, unsatisfactory pot life. The physical properties of the elastomer prepared in this case is also given in Table I.

The polyurethane elastomers in Example 1 demonstrates the advantages of my process. These advantages are namely, a process wherein the extender need not be heated and a process wherein the polyurethanes have satisfactory pot lives and have good physical properties on cure.

In the preparation of the elastomer in Example 1, the extender which was a liquid at room temperature was added to the preheated polyurethane prepolymer. This is to be compared with the procedure of Example 2.

Example 2 is not an embodiment of my invention but is an example of a polyurethane elastomer prepared by the conventional method of adding molten 4,4'-methylenebis(2-chloroaniline) to a preheated polyurethane prepolymer. When the physical properties of the elastomer prepared in Example 1 are compared with that prepared in Example 2, it is apparent that the elastomer of Example 1 has acceptable properties. Furthermore, the polyurethane elastomer of Example 1 had a very acceptable pot life in contrast to the polyurethane elastomer prepared in Example 2 which had a short pot life.

From the foregoing description I consider it to be clear that the present invention contributes a substantial benefit to the polyurethane art.

TABLE I.—POLYURETHANE ELASTOMERS

| Polyurethane prepolymer | Extender | Hardness A | Hardness D | Tensile (p.s.i.) | Elong., percent | $M_{100}$ (p.s.i.) | $M_{300}$ (p.s.i.) | Tear (p.s.i.) Die C | Tear (p.s.i.) Split | Abrasion wt. loss, g. | Resiliency, percent | $T_f$ °C. | Comp. set, percent |
| --- | --- | --- | --- | --- | --- | --- | --- | --- | --- | --- | --- | --- | --- |
| 1 | 1 eq. MOCA a/1 eq. EOBPA b | 90 | | 4,000 | 550 | 800 | 2,000 | 325 | 50 | 0.15 | 30 | −45 | 30 |
| 2 | MOCA | 96 | 55 | 6,410 | 350 | 1,900 | 4,385 | 399 | 135 | 0.20 | 45 | −55 | 33 | a MOCA = 4,4'-methylenebis(2-chloroaniline).
b EOBPA = ethylene oxide capped bisphenol A.

I claim:

1. A method for producing a polyurethane which comprises mixing a polyurethane prepolymer having NCO termination with a liquid extender, said polyurethane prepolymer being heated to a temperature between about 70°C. and 100°C., and said extender prepared by the steps:
   a. admixing 0.1 to 4 equivalents of 4,4'-methylenebis(2-chloroaniline) with 1 equivalent of ethylene oxide capped 4,4'-isopropylidenediphenol; and
   b. heating the admixture to solubilize the 4,4'-methylenebis(2-chloroaniline) in the ethylene oxide capped 4,4'-isopropylidenediphenol.

2. The method of claim 1 wherein the heating is at a temperature between 70°C. and 90°C.

3. The method of claim 1 wherein the number of equivalents of the polyurethane prepolymer and the liquid extender are substantially equal.

4. The method of claim 1 wherein the polyurethane prepolymer has an NCO/OH ratio of about 2/1.

5. The method of claim 1 wherein the ethylene oxide capped 4,4'-isopropylidenediphenol has an average molecular weight of about 500.

* * * * *